(12) United States Patent
Shimura

(10) Patent No.: US 7,186,014 B2
(45) Date of Patent: Mar. 6, 2007

(54) DOUBLE-FACED LIGHTING DEVICE

(75) Inventor: Takashi Shimura, Yamanashi-ken (JP)

(73) Assignee: Citizen Electronics Co., Ltd., Yamanashi-Ken (JP)

( * ) Notice: Subject to any disclaimer, the term of this patent is extended or adjusted under 35 U.S.C. 154(b) by 92 days.

(21) Appl. No.: 10/911,693

(22) Filed: Aug. 5, 2004

(65) Prior Publication Data

US 2005/0030727 A1 Feb. 10, 2005

(30) Foreign Application Priority Data

Aug. 8, 2003 (JP) .............................. 2003-289506

(51) Int. Cl.
*F21V 7/04* (2006.01)
(52) U.S. Cl. ...................... 362/606; 362/26; 362/602; 362/618; 349/65
(58) Field of Classification Search ................ 362/10, 362/26, 339, 606, 618, 602; 349/65
See application file for complete search history.

(56) References Cited

U.S. PATENT DOCUMENTS

| | | | | |
|---|---|---|---|---|
| 5,914,759 | A * | 6/1999 | Higuchi et al. ................ 349/57 |
| 6,648,485 | B1 * | 11/2003 | Colgan et al. .............. 362/600 |
| 2003/0179580 | A1 * | 9/2003 | Ito et al. ...................... 362/306 |
| 2003/0234897 | A1 * | 12/2003 | Ozawa ......................... 349/65 |
| 2005/0073627 | A1 * | 4/2005 | Akiyama ...................... 349/65 |

* cited by examiner

*Primary Examiner*—Stephen F Husar
*Assistant Examiner*—Meghan K. Dunwiddie
(74) *Attorney, Agent, or Firm*—Dennison, Schultz & MacDonald

(57) ABSTRACT

A lighting device has a light guide plate having light projecting surfaces at least on the one sides thereof, and at least one brightness enhancement film having a plurality of prisms and disposed adjacently to one of both sides of the light guide plate.

13 Claims, 3 Drawing Sheets

DOUBLE-FACED LIGHTING DEVICE

BACKGROUND OF THE INVENTION

The present invention relates to a double-faced lighting device comprising a light guide plate which emits light from both sides thereof. The lighting device is disposed between display panels which are disposed back to back, thereby lighting the display panels as backlight. For display panels, liquid crystal displays (LCD) are generally used.

In recent years, a lighting device having a thin thickness is widely used for various electronic equipments such as a personal computer, word processor, video game machine, and portable telephone. There is provided an electronic equipment in which two LCDs are disposed back to back so as to set the display panels on both sides of a case housing parts constructing the electronic equipment.

Heretofore, various backlight devices, each having a thin thickness and a uniform brightness are disclosed, for example in Japanese Patents 2739730, 2747241, Japanese Patent Laid Open Publications 2004-78047, 2004-87409, and Sumitomo Three-M Co. Ltd., Catalogue of Brightness Enhancement Film (BEF Series, REBEF Series).

However, if two sets of lighting devices are used for back-lighting both LCDs of an equipment, the number of parts increases, thickness of lighting device and steps of assembling increase, raising the cost of the lighting device and the equipment which contains the lighting device. In addition, the weight of the lighting device increases, reducing the portability of the equipment. Since both lighting devices are provided with exclusive light sources, a large amount of electric power is consumed.

On the other hand, in a lighting device having a light guide plate disposed for back-lighting opposed LCDs each of which has a different size of display area, reflecting property of light on a display panel having a smaller size of display area differs, when the display part and the peripheral part of the display panel are compared. In such a state, if a display panel having a larger size of display area receives light reflected by the smaller display panel, the intensity of light illuminating the larger display panel becomes nonuniform, because of irregular intensity of the received reflection lights.

In order to remove such a disadvantage, it is necessary to provide a diffusion sheet on an outside portion of the lighting device. However, there is a problem that the diffusion sheet reduces the intensity of the illuminating light.

SUMMARY OF THE INVENTION

An object of the present invention is to provide a lighting device which may uniformly illuminate the opposed display panels each of which has a different size of display area and is disposed back to back on a case of an equipment.

According to the present invention, there is provided a double-faced lighting device for an electronic equipment, wherein the electronic equipment has a large display panel and a small display panel provided on both sides of a case and disposed back to back, however, having optically overlapped portions with each other, the lighting device comprising a light guide plate provided in the case and having light emitting surfaces on both sides thereof, a light source provided at one of sides of light guide plate, for instance, as an edge light, at least one brightness enhancement film having a plurality of prisms and disposed adjacent to one of both sides of the light guide plate, a light absorbing sheet disposed adjacent to the small display panel in order not to overlap the small display panel.

The prisms of the brightness enhancement film are provided on a side facing the light guide plate.

There are portions that the small display panel overlaps the large display panel.

The light absorbing sheet has black color or gray color.

In an aspect of the present invention, the double-faced lighting device further comprises a semi-transmission reflection sheet provided between the large display panel and the brightness enhancement film.

The semi-transmission reflection sheet is a half-silvered mirror sheet.

In another aspect, the double-faced lighting device further comprises a plurality of prisms provided on at least one side of the light guide plate.

The prism is a scalene prism.

These and other objects and features of the present invention will become more apparent from the following detailed description with reference to the accompanying drawings.

BRIEF DESCRIPTION OF DRAWINGS

FIG. 2 is an enlarged side view of a part A of FIG. 1a;

DETAILED DESCRIPTION OF THE PREFERRED EMBODIMENT

Figure 1A:
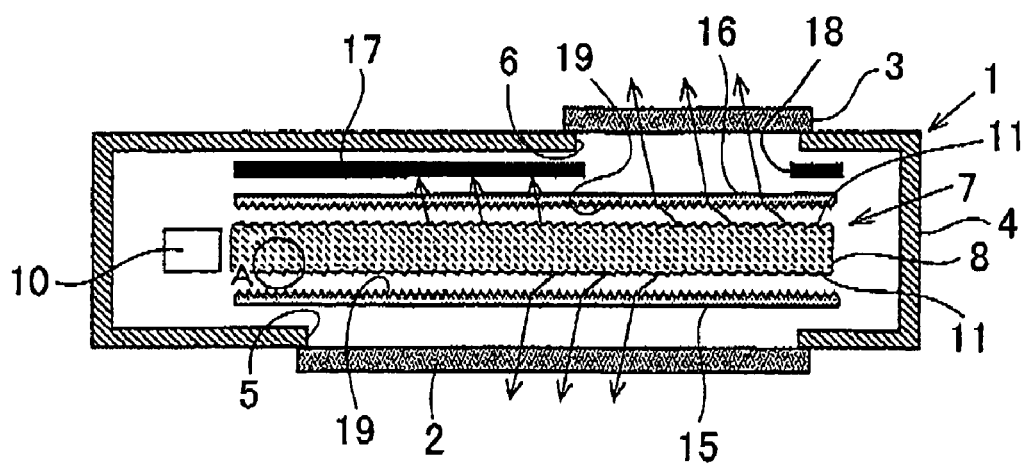
FIG. 1a is a sectional side view showing an electronic equipment provided with a lighting device according to a first embodiment of the present invention.
Figure 2:
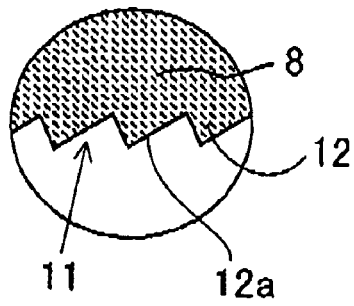
Figure 3:
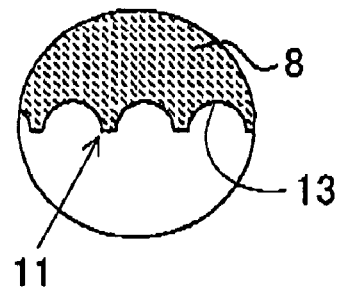
FIG. 3 is an enlarged side view showing another example of the part A.

FIG. 1a is a sectional side view showing an electronic equipment provided with a lighting device according to a first embodiment of the present invention, FIG. 2 is an enlarged side view of a part A of FIG. 1a, FIG. 3 is an enlarged side view showing another example of the part A.

The electronic equipment 1 has a large display panel 2 of an LCD and a small display panel 3 of another LCD mounted on a case 4 at apertures 5 and 6 respectively. The small display panel 3 has a display area smaller than that of the large display panel 2. Both the display panels 2 and 3 are disposed back to back and having optically overlapped portions.

The lighting device 7 of the present invention comprises a light guide plate 8 having a rectangular shape, made of a transparent resin and supported in the case 4, and a plurality of light sources 10 comprising LEDs disposed at one of short sides of the rectangular light guide plate 8. On at least one surface of the upper and lower surfaces of the light guide plate 8, reflecting surfaces 11 are formed. Each of the reflecting surfaces comprises a plurality of prisms 12 as shown in FIG. 2 or cylindrical faces 13 as shown in FIG. 3. The prism 12 is a scalene prism having a long face 12a at the light source side.

Brightness enhancement films 15 and 16 made of PET are provided between the lower surface of the light guide plate 8 and the large display panel 2, and between the upper surface of the light guide plate 8 and the small display panel 3, wherein the brightness enhancement films 15 and 16 have almost the same size as the light guide plate 8. On the side facing the light guide plate 8 of each of the brightness enhancement films 15, 16, a plurality of prisms 19 are formed for increasing the intensity of light.

A light absorbing sheet 17 is disposed between the light guide plate 8 and the small display panel 3. The light absorbing sheet is made of PET and has black color. The light absorbing sheet 17 has substantially the same size as that of the large display panel 2 and has an aperture 18 corresponding to the size of the small display panel 3. The light absorbing sheet 17 has a function to absorb incident lights.

In operation, light rays emitted from the light sources 10 enter the light guide plate 8 and travel in the light guide plate. The light rays in the light guide plate 8 are reflected by the reflecting surfaces 11 and project away from the upper and lower surfaces of the light guide plate 8. At that time, long faces 12a of reflecting surfaces 11 uniformly reflect the light rays, thereby equalizing discharged quantity of light.

Most of light rays are discharged from the light guide plate 8 through the brightness enhancement films 15 and 16 to back-light the undersides of the large display panel 2 and the small display panel 3. Light rays discharged from the light guide plate 8 in an oblique direction are reflected by the prisms 19 so that the light rays perpendicularly strike the large and small display panels 2 and 3, thereby increasing the brightness of the display panels.

Most of light rays striking circumferential portions of the small display panel 3 are absorbed by the light absorbing sheet 17 and a little amount of light rays are reflected by the light absorbing sheet 17. The amount of reflected light rays is almost equal to the amount of light rays reflected by the small display panel 3. Therefore, distribution of light rays from the side of the small display panel 3 are almost uniform. Thus the influence of the reflected light rays on the light illuminating the large display panel is small, so that irregularity of brightness does not occur.

Figure 1B:
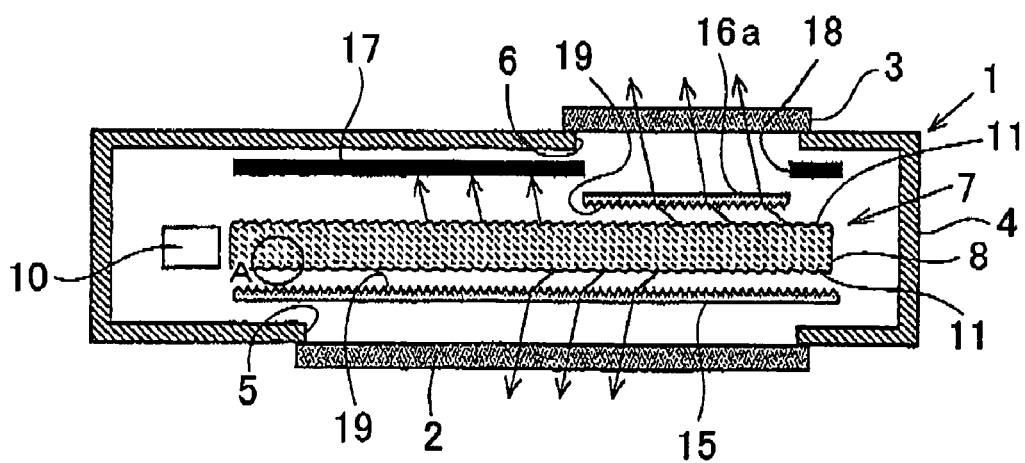
FIG. 1b is a sectional side view showing another example of an electronic equipment.

FIG. 1b shows another example of the first embodiment.

In the lighting device, a brightness enhancement film 16a having a small size which is substantially the same as that of the aperture 18 is provided instead of the brightness enhancing film 16 in FIG. 1a.

Other parts are the same as those of FIG. 1a in construction and operation, and are identified by the same reference numerals as FIG. 1a and explanation for these parts are omitted.

Figure 4:
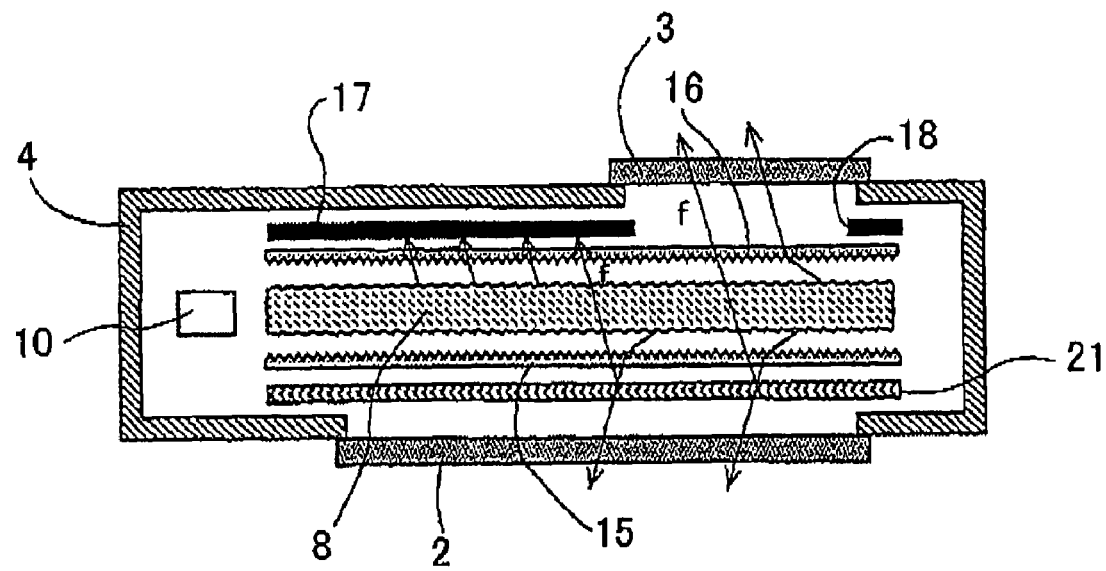
FIG. 4 is a sectional side view of an electronic equipment provided with a lighting device of a second embodiment of the present invention.

FIG. 4 is a sectional side view of an electronic equipment provided with a lighting device of a second embodiment of the present invention.

The lighting device is provided with a half-silvered mirror sheet 21 as a semi-transmission reflection sheet which is disposed between the large display panel 2 and the brightness enhancement film 15. Other parts are the same as those of FIG. 1a, and the same parts as FIG. 1a are identified by the same reference numerals as FIG. 1a.

In the half-silvered mirror sheet 21, the intensity of transmission light is equal to the intensity of reflection light. The transmission light having reduced intensity illuminates the large display panel 2.

On the other hand, reflected light rays f are added to light rays applied to the small display panel 3. Therefore, the small display panel 3 is illuminated by light having high intensity. Thus, the intensity of light rays applied to both display panels can be largely changed. For example, it is preferable to use the small size light guide plate for brightly lighting an underside small display panel of a portable telephone.

Figure 5:
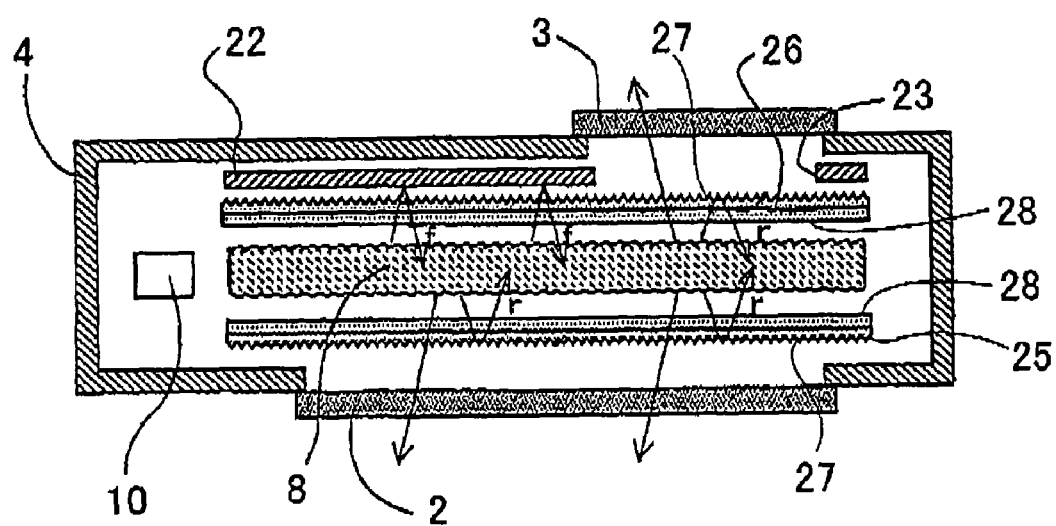
FIG. 5 is a sectional side view of an electronic equipment provided with a lighting device of a third embodiment of the present invention.

FIG. 5 is a sectional side view of an electronic equipment provided with a lighting device of a third embodiment of the present invention.

In the lighting device, a light absorbing sheet 22 is provided instead of the light absorbing black sheet 17 in the first and second embodiments. The light absorbing sheet 22 is disposed between the light guide plate 8 and the small display panel 3. The light absorbing sheet is made of PET and has gray color. The light absorbing sheet 22 has a size substantially the same as that of the large display panel 2 and has an aperture 23 corresponding to the small display panel 3.

The light absorbing gray sheet 22 has a function to absorb a part of light rays and to reflect the other part.

Furthermore, each of the brightness enhancement films 15 and 16 in the first and second embodiments are changed into a brightness enhancement double film 25 and a brightness enhancement double film 26. Each of the brightness enhancement double films 25 and 26 has a plurality of prisms 27 on the side facing the display panel 2 (3) and prisms 28 on the side facing the light guide plate 8, elongating in the perpendicular direction to the direction of the prisms 27.

Incident light rays in the brightness enhancement double films 25 and 26 are reflected by the outside prisms 27 to be returned as recycle light r. On the other hand, the reflected light f from the light absorbing sheet 22 strike the light guide plate 8. The light absorbing efficiency of the light absorbing sheet 22 is set to such a value that the intensity of the reflected light f from the light absorbing sheet 22 balances with the intensity of the recycle light r. Therefore, the brightness of the surface of the large display panel 2 is uniformly distributed.

Figure 6:
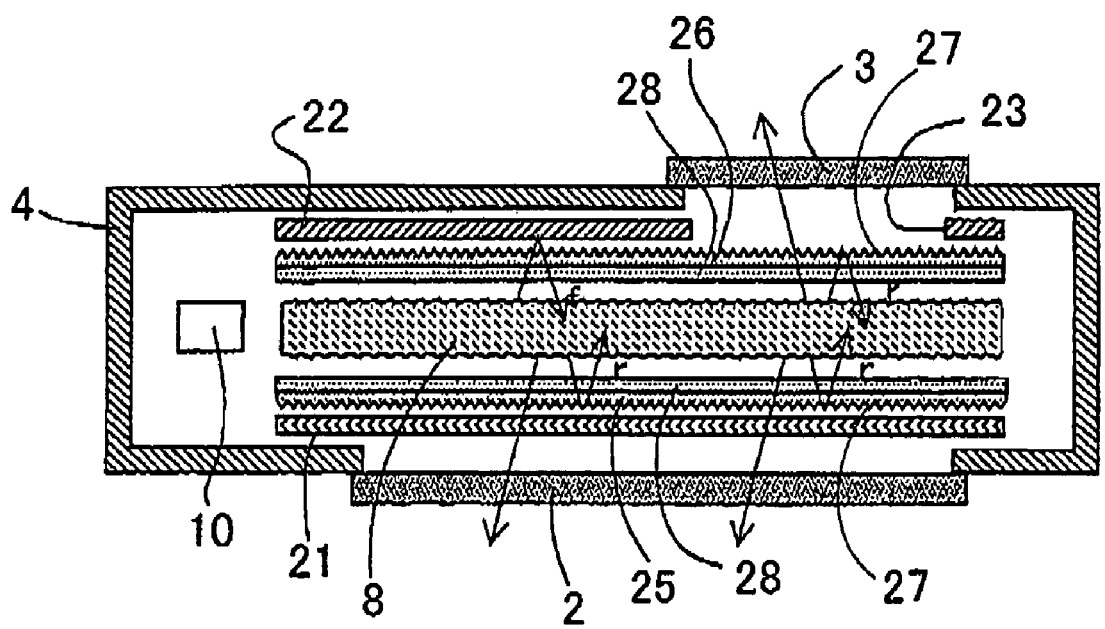
FIG. 6 is a sectional side view of an electronic equipment provided with a lighting device of a fourth embodiment of the present invention.

FIG. 6 is a sectional side view of an electronic equipment provided with a lighting device of a fourth embodiment of the present invention.

In the lighting device, the half-silvered mirror sheet 21 of the second embodiment of FIG. 4 is provided between the large display panel 2 and the brightness enhancement double film 25 of the third embodiment of FIG. 5. Other parts are the same as those of the lighting device of FIG. 5, and identified by the same reference numerals as FIG. 5.

Similar to the third embodiment, the brightness of the large display panel 2 is uniformly distributed.

Furthermore, since the half-silvered mirror sheet 21 is provided, the brightness of the large display panel 2 reduces, the brightness of the small display panel 3 increases by the reflection light from the half-silvered mirror sheet 21 instead. Thus, the brightness of both display panels can be largely controlled.

In the second and fourth embodiments, the half-silvered mirror sheet 21 can be replaced with a white diffusion sheet of half transmissive type, which has the same effect as the half-silvered mirror sheet.

Further, instead of the light absorbing sheets 17 and 22, it is possible to change a part of the case 4 corresponding to the sheet 17 (22) into a surface having the same function as the light absorbing sheet.

In accordance with the present invention, since a brightness enhancement film is provided, back-lighting light is condensed to the display panel of the LCD, the display panel is brightly and uniformly illuminated. Further, the brightness of the large display panel becomes uniform by the light absorbing sheet.

While the invention has been described in conjunction with preferred specific embodiment thereof, it will be understood that this description is intended to illustrate and not limit the scope of the invention, which is defined by the following claims.

What is claimed is:

1. A double-faced lighting device for electronic equipment, wherein the electronic equipment has a large display panel and a small display panel provided in back-to back relationship on opposite sides of a case, with the large display panel adjacent a first aperture in the case and the small display panel adjacent a second aperture in the case, the lighting device comprising:
   a light guide plate provided in the case and having light emitting surfaces on opposite faces thereof;
   a light source provided at an edge of the light guide plate as an edge light;
   at least one brightness enhancement film having a plurality of prisms and disposed adjacent to both light emitting surfaces of the light guide plate;
   a light absorbing sheet disposed within the case between the small display panel and an adjacent light emitting surface for absorbing incident light from the light guide plate, the light absorbing sheet having an aperture provided adjacent the second aperture in the case such that light from the light emitting surface of the light guide plate passes through the aperture in the light absorbing sheet and the aperture in the case to illuminate the small display panel.

2. The double-faced lighting device according to claim 1, wherein the prisms of the at least one brightness enhancement film are provided on a side facing an adjacently disposed light emitting surface of the light guide plate.

3. The double-faced lighting device according to claim 1, wherein there are portions in which the small display panel overlaps the large display panel.

4. The double-faced lighting device according to claim 1, wherein the light absorbing sheet has black color.

5. The double-faced lighting device according to claim 1, wherein the light absorbing sheet has gray color.

6. The double-faced lighting device according to claim 1, wherein the prisms of the at least one brightness enhancement film are provided on a side facing each of the display panels.

7. The double-faced lighting device according to claim 1, further comprising a semi-transmission reflection sheet provided between the large display panel and the adjacently disposed brightness enhancement film.

8. The double-faced lighting device according to claim 1, further comprising a plurality of projections provided on at least one side of the light guide plate.

9. The double-faced lighting device according to claim 7, wherein the semi-transmission reflection sheet is a half-silvered mirror sheet.

10. The double-faced lighting device according to claim 8, wherein each of the projections is a prism.

11. The double-faced lighting device according to claim 10, wherein the prism is a scalene prism.

12. The double-faced lighting device, according to claim 1, wherein the at least one brightness enhancement sheet is about the same size as the light guide plate.

13. The double-faced lighting device according to claim 1, wherein the at least one brightness enhancement sheet which is disposed between the small display panel and the adjacently disposed light emitting surface of the light guide plate is substantially the same size as the aperture of the light absorbing sheet.

* * * * *